United States Patent
Kondo

(10) Patent No.: US 8,705,129 B2
(45) Date of Patent: Apr. 22, 2014

(54) PRINTING SYSTEM THAT PERFORMS A COLOR CONVERSION PROCESS, PRINTING METHOD, AND NON-TRANSITORY COMPUTER READABLE RECORDING MEDIUM STORED WITH PRINTING PROGRAM

(75) Inventor: Katsuji Kondo, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2 days.

(21) Appl. No.: 13/563,988

(22) Filed: Aug. 1, 2012

(65) Prior Publication Data

US 2013/0038886 A1 Feb. 14, 2013

(30) Foreign Application Priority Data

Aug. 11, 2011 (JP) .................. 2011-175988

(51) Int. Cl.
*G06F 15/00* (2006.01)
(52) U.S. Cl.
USPC ........................................................... 358/1.9
(58) Field of Classification Search
None
See application file for complete search history.

(56) References Cited

U.S. PATENT DOCUMENTS

| | | | | |
|---|---|---|---|---|
| 5,305,119 A | * | 4/1994 | Rolleston et al. | 358/522 |
| 5,528,386 A | * | 6/1996 | Rolleston et al. | 358/522 |
| 6,014,457 A | * | 1/2000 | Kubo et al. | 382/167 |
| 7,688,470 B2 | * | 3/2010 | Monga et al. | 358/1.9 |
| 7,944,583 B2 | * | 5/2011 | Yabe | 358/1.6 |
| 2002/0179829 A1 | * | 12/2002 | Nikitin et al. | 250/237 G |
| 2005/0259280 A1 | * | 11/2005 | Rozzi | 358/1.9 |
| 2007/0070371 A1 | | 3/2007 | Miyazaki | |
| 2010/0321747 A1 | | 12/2010 | Sakamoto et al. | |

FOREIGN PATENT DOCUMENTS

| | | |
|---|---|---|
| JP | 2004-356952 A | 12/2004 |
| JP | 2007-089031 A | 4/2007 |
| JP | 2011-004167 | 1/2011 |

OTHER PUBLICATIONS

Notification of Reason for Refusal issued in corresponding Japanese Patent Application No. 2011-175988, mailed Sep. 3, 2013 and English translation thereof.

* cited by examiner

*Primary Examiner* — Jeremiah Bryar
(74) *Attorney, Agent, or Firm* — Buchanan Ingersoll & Rooney PC

(57) ABSTRACT

A printing system of the present invention includes: a generating unit which performs a rasterizing process to print data while performing a color conversion process by applying a multi-dimensional lookup table for calibration, which is for matching a color of the image to be printed by a printing unit by combining base colors to a target color and for keeping the color of the image consistent, to generate image data; a storage unit which stores the image data; a calibration unit which applies a first one-dimensional lookup table for calibration to calibrate the color information of the image data at a first round of printing the image, and applies a second one-dimensional lookup table for calibration newer than the first one-dimensional lookup table for calibration to calibrate the color information of the image data at a second round of newly printing the image.

9 Claims, 8 Drawing Sheets

240

| Screen type | Paper type | | | | | |
| --- | --- | --- | --- | --- | --- | --- |
| | Plain paper | | Mat paper | | Coated paper | |
| | One dimension | Four dimension | One dimension | Four dimension | One dimension | Four dimension |
| Dot screen | LUT - A | LUT - B | LUT - C | LUT - D | LUT - E | LUT - F |
| Line screen | LUT - G | LUT - H | LUT - I | LUT - J | LUT - K | LUT - L |
| Stochastic screen | LUT - M | LUT - N | LUT - O | LUT - P | LUT - Q | LUT - R |

PRINTING SYSTEM THAT PERFORMS A COLOR CONVERSION PROCESS, PRINTING METHOD, AND NON-TRANSITORY COMPUTER READABLE RECORDING MEDIUM STORED WITH PRINTING PROGRAM

CROSS-REFERENCE TO RELATED APPLICATION

This application is based on Japanese Patent Application No. 2011-175988 filed on Aug. 11, 2011, the contents of which are incorporated herein by reference.

BACKGROUND

1. Technical Field

The present invention relates to a printing system, a printing method, and a non-transitory computer readable recording medium stored with printing program, for printing a color image.

2. Description of Related Art

In recent years, in the color printing industry, on-demand-printing equipment such as an electro photographic printer and an inkjet printer has become more widely utilized. Therefore, color calibration is increasingly important for maintaining printing quality of the printing equipment.

Regarding color calibration of the printing equipment, a known technique applies one-dimensional curves (one-dimensional LUTs: one-dimensional lookup tables) for each of base colors of C (cyan), M (magenta), Y (yellow) and K (black) to calibrate the gradation of each base color. The color calibration using one-dimensional LUTs allows small calculation load and provides processing in a short time, but it cannot accommodate a big change in superposition balance of a plurality of base colors due to a change of printing environment or material's lot. For this reason, a color calibration using multi-dimensional LUT such as three-dimensional or four-dimensional LUT has been proposed from the viewpoint of keeping the superposition balance of a plurality of base colors consistent (for example, Unexamined Japanese Patent Publication No. 2007-089031). Since color calibration using the multi-dimensional LUT has a heavy calculation load, such color calibration is usually performed simultaneously with a rasterizing process (a RIP process) to the print data described in page description language (PDL) to reduce processing time.

On the other hand, in the production of printed matter, a sample for proofreading is usually printed before printing the required number of copies. Then, the required number of copies are printed after final proofreading of the sample for proofreading. Therefore, the image data obtained by performing the RIP process to the print data at the time of printing the sample for proofreading is stored in a hard disk, and the image data is read from the hard disk and is reused at the time of printing the required number of copies. According to such constitution, it is not necessary to perform the RIP process to the print data again at the time of printing the required number of copies, and processing time is reduced.

However, the printing environment may be changed after printing the sample for proofreading before printing the required number of copies, and it may be necessary to change calibration conditions. In cases where the calibration conditions need to be changed, LUT for calibration is newly generated. In the printing system which performs the color calibration using the multi-dimensional LUT, the color calibration is performed simultaneously with the RIP process, therefore it is necessary to perform the RIP process to the print data again to regenerate the image data, in order to perform the color calibration by applying the newly generated LUT and to print the required number of copies. However, this causes processing time to be long and it is not preferable.

SUMMARY

The present invention is made in view of the above problems. Therefore, an object of the present invention is to provide a printing system, a printing method, and a non-transitory computer readable recording medium stored with printing program, capable of performing a color calibration without performing a RIP process when newly printing printed matter that was printed before, in a printing system which performs the color calibration using a multi-dimensional lookup table for calibration.

To achieve at least one of the abovementioned objects, a printing system reflecting one aspect of the present invention includes: a receiving unit that receives print data; a generating unit that performs a rasterizing process to the print data received by the receiving unit, and performs a color conversion process by applying a multi-dimensional lookup table for calibration, which is for matching a color of the image to be printed by a printing unit by combining a plurality of base colors to a target color and for keeping the color of the image consistent, to generate image data of which the color information has been calibrated; an image data storage unit that stores the image data generated by the generating unit; a calibration unit that applies a first one-dimensional lookup table for calibration, which is for keeping the color of the image to be printed by the printing unit consistent for each base color, to calibrate the color information of the image data generated by the generating unit at a first round of printing the image based on the image data, and applies a second one-dimensional lookup table for calibration newer than the first one-dimensional lookup table for calibration to calibrate the color information of the image data stored in the image data storage unit at a second round of newly printing the image based on the image data; and an output unit that outputs the image data of which the color information has been calibrated by the calibration unit.

To achieve at least one of the abovementioned objects, a printing method reflecting another aspect of the present invention includes: (a) receiving print data; (b) performing a rasterizing process to the print data received in step (a), and performing a color conversion process by applying a multi-dimensional lookup table for calibration, which is for matching a color of the image to be printed by a printing unit by combining a plurality of base colors to a target color and for keeping the color of the image consistent, to generate image data of which the color information has been calibrated; (c) storing the image data generated in step (b) into an image data storage unit; (d) applying a first one-dimensional lookup table for calibration, which is for keeping the color of the image to be printed by the printing unit consistent for each base color, to calibrate the color information of the image data generated in step (b); (e) outputting the image data of which the color information has been calibrated in step (d); (f) applying a second one-dimensional lookup table for calibration newer than the first one-dimensional lookup table for calibration to calibrate the color information of the image data stored in the image data storage unit; and (g) outputting the image data of which the color information has been calibrated in step (f).

To achieve at least one of the abovementioned objects, a non-transitory computer readable recording medium reflecting still another aspect of the present invention is a computer readable recording medium stored with printing program, said program causing a computer to execute a process which includes: (a) receiving print data; (b) performing a rasterizing process to the print data received in step (a), and performing a color conversion process by applying a multi-dimensional lookup table for calibration, which is for matching a color of the image to be printed by a printing unit by combining a plurality of base colors to a target color and for keeping the color of the image consistent, to generate image data of which the color information has been calibrated; (c) storing the image data generated in step (b) into an image data storage unit; (d) applying a first one-dimensional lookup table for calibration, which is for keeping the color of the image to be printed by the printing unit consistent for each base color, to calibrate the color information of the image data generated in step (b); (e) outputting the image data of which the color information has been calibrated in step (d); (f) applying a second one-dimensional lookup table for calibration newer than the first one-dimensional lookup table for calibration to calibrate the color information of the image data stored in the image data storage unit; and (g) outputting the image data of which the color information has been calibrated in step (f).

The objects, features, and characteristics of this invention other than those set forth above will become apparent from the description given herein below with reference to preferred embodiments illustrated in the accompanying drawings.

DETAILED DESCRIPTION

The embodiments of this invention will be described below with reference to the accompanying drawings.

Figure 1:
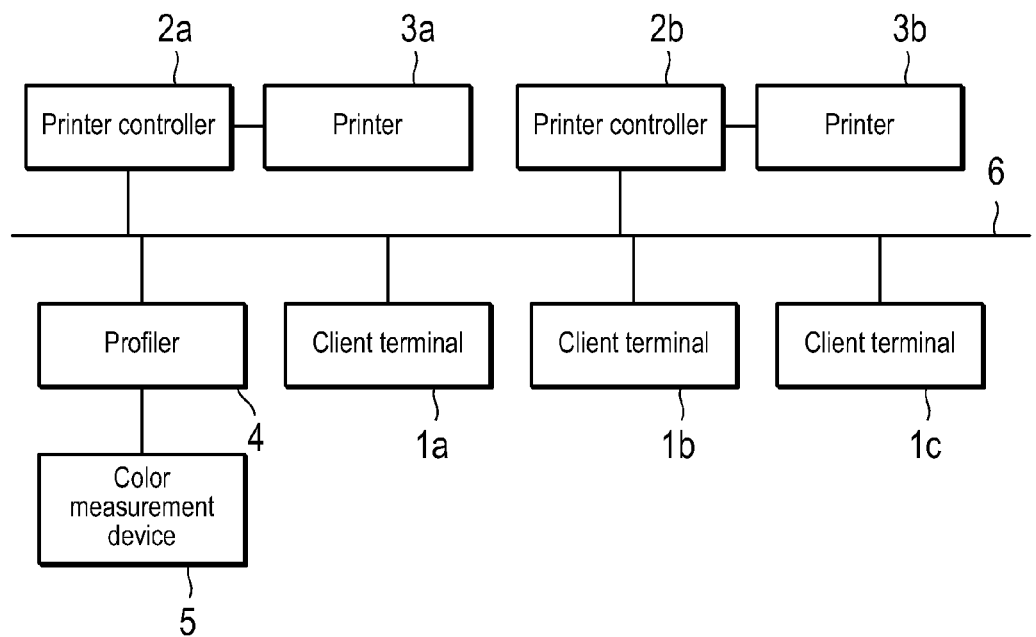
FIG. 1 is a block diagram illustrating an overall structure of a printing system according to an embodiment of the present invention.

FIG. 1 is a block diagram illustrating an overall structure of a printing system according to an embodiment of the present invention.

As illustrated in FIG. 1, the printing system includes client terminals 1a, 1b and 1c, printer controllers 2a and 2b, printers 3a and 3b, a profiler 4, and a color measurement device 5. The client terminals 1a, 1b and 1c, the printer controllers 2a and 2b, and the profiler 4 are connected through a network 6 so that mutual communication is possible. The Network can be LAN (Local Area Network) which connects computers and network devices to each other according to standards such as Ethernet, Token Ring, and FDDI (Fiber Distributed Data Interface), WAN (Wide Area Network) which connects LANs to each other by a dedicated line, or the like. The printer controllers 2a, 2b and the printers 3a, 3b are connected respectively through buses for dedicated interfaces such as IEEE1394 serial bus and USB (Universal Serial Bus), for example. The profiler 4 and the color measurement device 5 are connected through a dedicated line.

Alternatively, the printer controllers 2a, 2b and the printers 3a, 3b may be connected through the network 6. Moreover, the type and the number of the devices connected to the network 6 are not limited to an example illustrated in FIG. 1.

Figure 2:
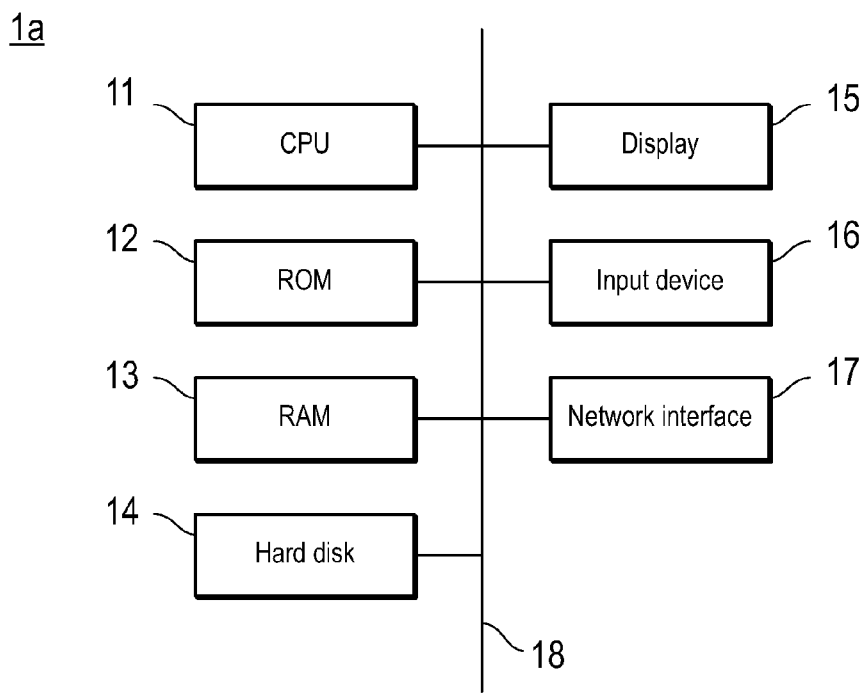
FIG. 2 is a block diagram illustrating a schematic structure of a client terminal illustrated in FIG. 1.

FIG. 2 is a block diagram illustrating a schematic structure of the client terminal. The client terminals 1a, 1b and 1c can be general PCs (Personal Computers), for example. Since the client terminals 1a, 1b and 1c can have a same constitution, hereinafter, the client terminal 1a will be explained on behalf of the client terminals.

The client terminal 1a includes a CPU (Central Processing Unit) 11, a ROM (Read Only Memory) 12, a RAM (Random Access Memory) 13, a hard disk 14, a display 15, an input device 16, and a network interface 17, which are connected to each other through a bus 18 for exchanging signals.

The CPU 11 controls the above-described units and performs various kinds of calculation processes according to programs. The ROM 12 stores various programs and various data. The RAM 13 stores programs and data temporarily as a workspace.

The hard disk 14 stores various programs including an operating system, and various data. A document file generating application for generating a document file and a printer driver for converting the document file into a print data described in the page description language which can be interpreted by the printer controllers 2a, 2b are installed on the hard disk 14.

The display 15 is, for example, a liquid crystal display and displays various kinds of information. The input device 16, for example, includes a pointing device such as a mouse and a keyboard, and is used to input various kinds of information. The network interface 17 is an interface for communicating with other device (s) through the network 6, and complies with standards such as Ethernet, Token Ring and FDDI.

Figure 3:
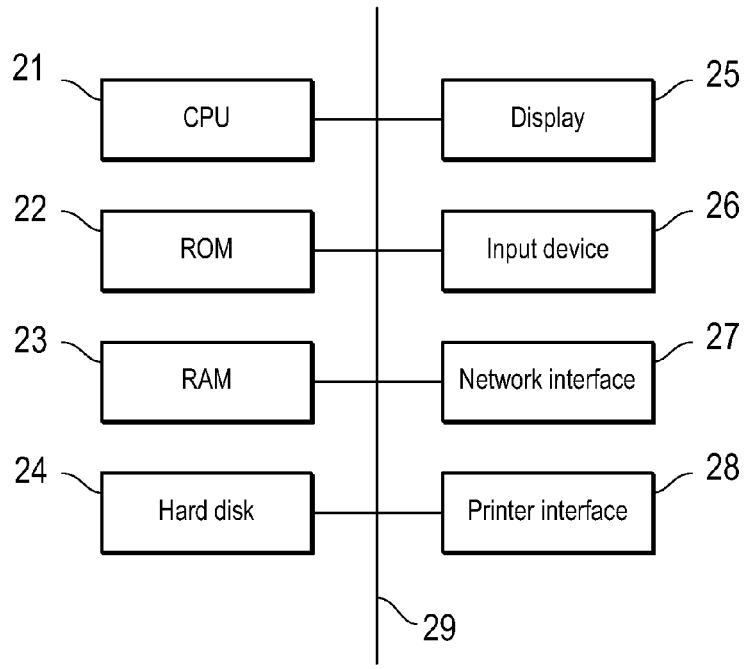
FIG. 3 is a block diagram illustrating a schematic structure of a printer controller illustrated in FIG. 1.

FIG. 3 is a block diagram illustrating a schematic structure of the printer controller. Since the printer controllers 2a and 2b can have a same constitution, hereinafter, the printer controller 2a will be explained on behalf of the printer controllers.

The printer controller 2a includes a CPU 21, a ROM 22, a RAM 23, a hard disk 24, a display 25, an input device 26, a network interface 27, and a printer interface 28, which are connected to each other through a bus 29 for exchanging signals. The explanation about units that have the same function as the above-described units of the client terminal 1a, among the above-described units of the printer controller 2a, is omitted in order to avoid repetition of explanation.

The printer interface 28 is an interface for communicating with the printer 3a which has a local connection with the printer controller 2a.

The display 25 and the input device 26 serve as a accepting unit which accepts a selection, by a user, whether or not the color conversion process described below is to be performed. Moreover, the network interface 27 serves as a receiving unit which receives print data, and the printer interface 28 serves as an output unit which outputs image data generated from the print data.

Figure 4:
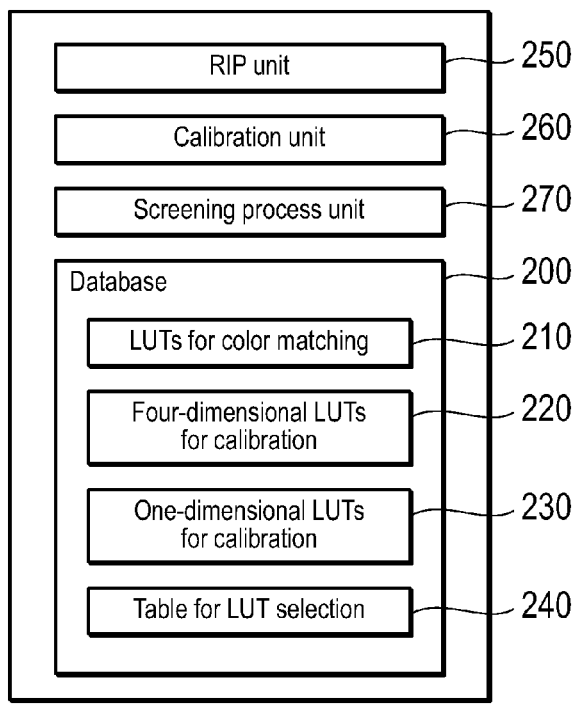
FIG. 4 is a block diagram illustrating contents in a hard disk of the printer controller illustrated in FIG. 3.

FIG. 4 is a block diagram illustrating contents in the hard disk of the printer controller. The hard disk 24 of the printer controller 2a stores LUTs for color matching 210, four-dimensional LUTs for calibration 220, one-dimensional LUTs for calibration 230, and a table for LUT selection 240 as a database 200.

The LUTs for color matching 210 are LUTs for adjusting the difference in color between output devices, and a plurality of LUTs are stored. The four-dimensional LUTs for calibration 220 are LUTs for matching the color (superposition balance) of the image, which is to be printed by the printer 3a by combining four base colors, with a target color, and keeping the color of the image consistent. The one-dimensional LUTs for calibration 230 are LUTs for keeping the color of the image to be printed by the printer 3a consistent with respect to each base color. The one-dimensional LUTs for calibration 230 include four LUTs corresponding to four base colors C, M, Y and K respectively. The four-dimensional LUTs for calibration 220 and the one-dimensional LUTs for calibration 230 are generated by the profiler 4 and are stored in the hard disk 24. The time information which illustrates the date and time when the LUTs are generated is added to the four-dimensional LUTs for calibration 220 and the one-dimensional LUTs for calibration 230. Also, the hard disk 24 stores a plurality of sets of one-dimensional LUTs for calibration and the four-dimensional LUTs for calibration, the generated date and time thereof being different. Moreover, a plurality of four-dimensional LUTs for calibration 220 and the one-dimensional LUTs for calibration 230 are stored in association with paper type and screen type in a screening process.

Figures 5, 6:
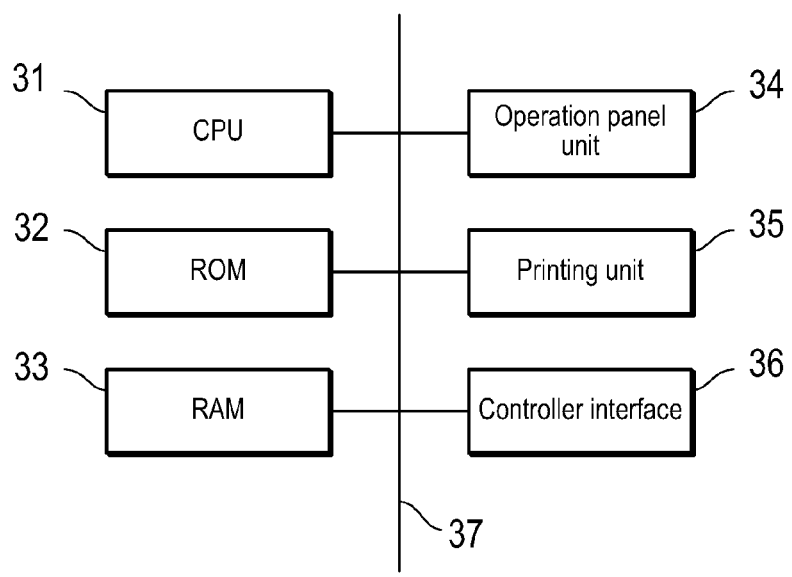
FIG. 5 is a drawing illustrating an example of a table for LUT selection.
FIG. 6 is a block diagram illustrating a schematic structure of a printer illustrated in FIG. 1.

The table for LUT selection 240 is for selecting the four-dimensional LUT for calibration and the one-dimensional LUT for calibration according to the paper type and the screen type. As illustrated in FIG. 5, in the table for LUT selection 240, the paper type (plain paper, mat paper and so on) and the screen type (a dot screen, a line screen and so on), and the names of the one-dimensional LUTs for calibration and the four-dimensional LUTs for calibration (LUT-A, LUT-B and so on) are associated.

The hard disk 24 includes each of the areas for storing programs corresponding to a RIP unit (generating unit) 250, a calibration unit 260, and a screening process unit 270. The RIP unit 250 performs a RIP process to the print data received from the client terminals 1a, 1b and 1c to generate the image data in bitmap format. The RIP unit 250 of the present embodiment performs a color conversion process simultaneously with the RIP process by applying the LUTs for color matching and the four-dimensional LUT for calibration to generate the image data of which the color information is calibrated. The calibration unit 260 applies the one-dimensional LUTs for calibration to calibrate the color information of each pixel of the image data generated by the RIP process. The screening process unit 270 performs the screening process to the image data of which the color information has been calibrated. The functions of the RIP unit 250, the calibration unit 260 and the screening process unit 270 can be achieved by executing programs corresponding thereto by the CPU 21.

FIG. 6 is a block diagram illustrating a schematic structure of the printer. Since the printers 3a and 3b can have a same constitution, hereinafter, the printer 3a will be explained on behalf of the printers. The printer 3a includes a CPU 31, a ROM 32, a RAM 33, an operation panel unit 34, a printing unit 35, and a controller interface 36, which are connected to each other through a bus 37 for exchanging signals. The explanation about units that have the same function as the above-described units of the client terminal 1a, among the above-described units of the printer 3a, is omitted in order to avoid repetition of explanation.

The operation panel unit 34 is used for displaying various kinds of information and for inputting various instructions. The printing unit 35 prints the image based on the image data received from the printer controller 2a on recording medium such as a paper, using known imaging process such as an electro photographic process. The printing unit 35 prints the image using the toners of four colors C, M, Y and K. The controller interface 36 is an interface for communicating with the printer controller 2a.

Figure 7:
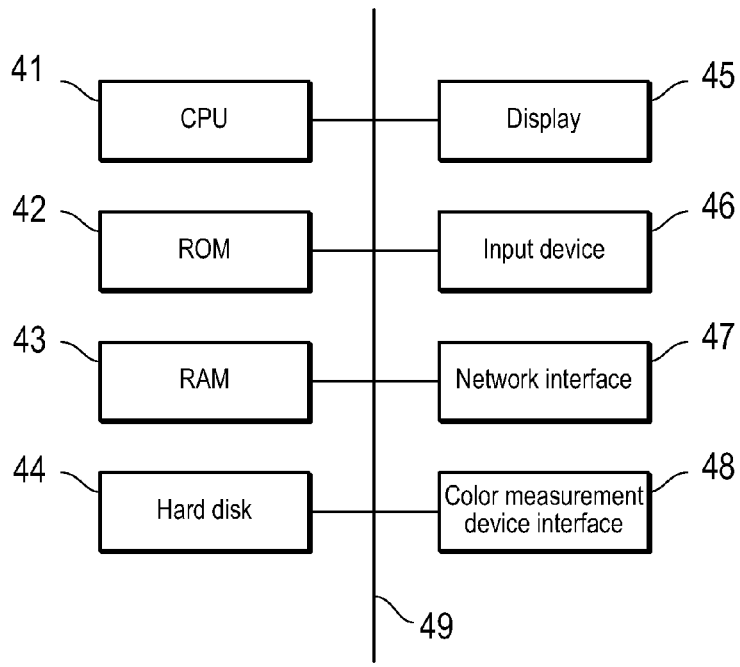
FIG. 7 is a block diagram illustrating a schematic structure of a profiler illustrated in FIG. 1.

FIG. 7 is a block diagram illustrating a schematic structure of the profiler. The profiler 4 can be a general PC, for example. The profiler 4 includes a CPU 41, a ROM 42, a RAM 43, a hard disk 44, a display 45, an input device 46, a network interface 47, and a color measurement device interface 48, which are connected each other through a bus 49 for exchanging signals. The explanation about units that have the same function as the above-described units of the client terminal 1a, among the above-described units of the profiler 4, is omitted in order to avoid repetition of explanation.

The color measurement device interface 48 is an interface for communicating with the color measurement device 5 which has a local connection with the profiler 4. The color measurement device 5 includes, for example, three kinds of sensors corresponding to the three primary colors of the light, Red, Green and Blue, and measures colors based on output values (RGB values) from the three kinds of sensors with respect to each part of the color image.

Figure 8:
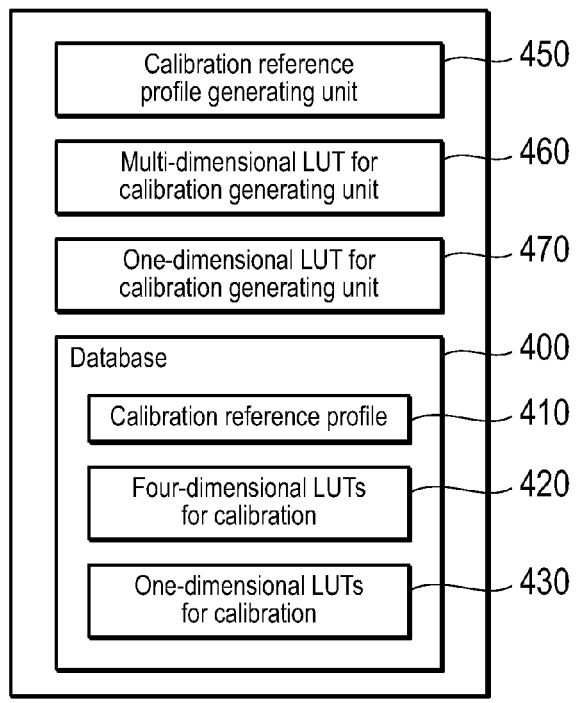
FIG. 8 is a block diagram illustrating contents in a hard disk of the profiler illustrated in FIG. 7.

FIG. 8 is a block diagram illustrating contents in the hard disk of the profiler. The hard disk 44 of the profiler 4 stores a calibration reference profile 410, four-dimensional LUTs for calibration 420, and one-dimensional LUTs for calibration 430 as a database 400. The calibration reference profile 410 is used for generating the four-dimensional LUTs for calibration 420 and the one-dimensional LUTs for calibration 430.

The hard disk 44 includes each of the areas for storing programs corresponding to a calibration reference profile generating unit 450, a multi-dimensional LUT for calibration generating unit 460, and a one-dimensional LUT for calibration generating unit 470.

The calibration reference profile generating unit 450 generates the calibration reference profile 410. The multi-dimensional LUT for calibration generating unit 460 generates the four-dimensional LUTs for calibration 420. The one-dimensional LUT for calibration generating unit 470 generates the one-dimensional LUTs for calibration 430 corresponding to each of base colors C, M, Y and K, respectively. The functions of the calibration reference profile generating unit 450, the multi-dimensional LUT for calibration generating unit 460, and the one-dimensional LUT for calibration generating unit 470 can be achieved by executing programs corresponding thereto by the CPU 41.

The client terminals 1a, 1b and 1c, the printer controllers 2a and 2b, the printers 3a and 3b, and the profiler 4 may include components other than the above-described components, and may not include a part of above-described components.

In the printing system of the present embodiment constituted as above, when producing printed matter, at first, a first round of printing process (first printing process) is performed in which a sample for proofreading is printed based on the print data transmitted from the client terminal 1a. Then, after proofreading of the sample for proofreading has been completed, a second round of printing process (second printing process) is performed in which required number of copies are printed. Hereinafter, operation of the printing system is explained with reference to FIG. 9 through FIG. 13.

Figure 9:
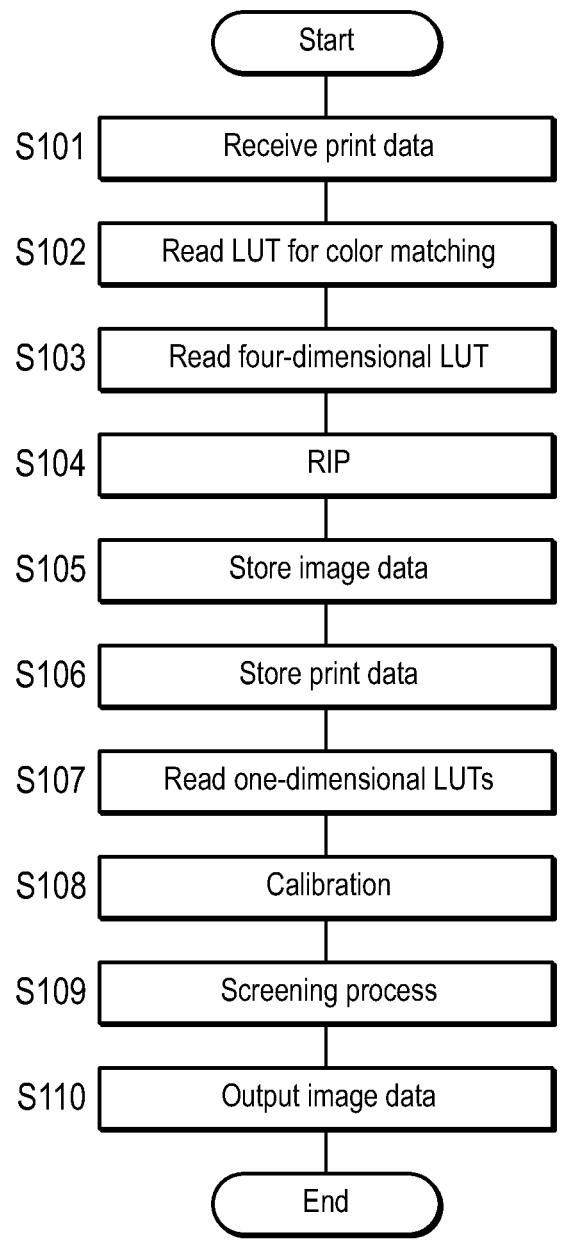
FIG. 9 is a flowchart which illustrates a procedure of a first printing process executed by the printer controller.

FIG. 9 is a flowchart which illustrates a procedure of the first printing process executed by the printer controller. The algorithm illustrated by the flowchart of FIG. 9 is stored as a program in the hard disk 24 of the printer controller 2a and is performed by the CPU 21.

First, the print data is received (step S101). In the present embodiment, the print data transmitted from the client terminal 1a is received, for example. The print data includes not only drawing information for generating the image data but also information for specifying the LUT for color matching, information for specifying the paper type on which the image is formed, and information for specifying the screen type in the screening process. These pieces of information are designated by the user of the client terminal 1a through a print setting screen (not illustrated) provided by the printer driver, for example.

Next, the LUT for color matching is read (step S102). In the present embodiment, the LUT for color matching designated by the print data is read from among a plurality of LUTs for color matching stored in the hard disk 24.

Next, the four-dimensional LUT for calibration is read (step S103). In the present embodiment, the four-dimensional LUT for calibration specified by the paper type and the screen type which are designated by the print data is read from among a plurality of four-dimensional LUTs for calibration stored in the hard disk 24. Specifically, reference is made to the table for LUT selection 240 (refer to FIG. 5) stored in the hard disk 24, which serves as a table storage unit, and the four-dimensional LUT for calibration of which the name is specified by the paper type and the screen type designated by the print data is read. In cases where two or more four-dimensional LUTs for calibration which have identical name are stored in the hard disk 24, the latest four-dimensional LUT for calibration is read.

Next, the RIP process is performed (step S104). In the present embodiment, the print data received in the process of step S101 is subject to the RIP process. Here, the LUT for color matching and the four-dimensional LUT for calibration which have been read in the process of steps S102 and S103 are applied to perform the color conversion process. Performing the color conversion process and the RIP process simultaneously, for example, allows the color conversion per object and allows reduction in calculation load. Performing the RIP process and the color conversion process causes generation of the image data of which the color information is calibrated. The process of performing the color conversion process by applying the LUT for color matching and the four-dimensional LUT for calibration while performing the RIP process of the print data is a general RIP process with the color conversion process, therefore detailed explanation thereof is omitted.

Next, the image data is stored into the hard disk 24 (step S105). In the present embodiment, the image data generated in the process of step S104 is stored for reuse into the hard disk 24 which serves as an image data storage unit.

Next, the print data is stored (step S106). In the present embodiment, the print data received in the process of step S101 is stored for reuse into the hard disk 24 in association with the image data.

Next, the one-dimensional LUTs for calibration are read (step S107). In the present embodiment, the one-dimensional LUTs for calibration specified by the paper type and the screen type which are designated by the print data are read from among a plurality of one-dimensional LUTs for calibration stored in the hard disk 24. Specifically, the table for LUT selection 240 (refer to FIG. 5) stored in the hard disk 24 is referred to, and the one-dimensional LUTs for calibration of which the name is specified by the paper type and the screen type designated by the print data are read. In cases where two or more one-dimensional LUTs for calibration which have identical name are stored in the hard disk 24, the latest one-dimensional LUTs for calibration are read.

Next, the color calibration is performed (step S108). In the present embodiment, the one-dimensional LUTs for calibration which have been read in the process of step S107 is applied, and the color information of each pixel of the image data generated in the process of step S104 is calibrated. More specifically, the densities of C, M, Y, and K of each pixel of the image data are calibrated by applying the one-dimensional LUTs for calibration which correspond to the colors respectively. The process of calibrating the color information of the image data by applying the one-dimensional LUTs for calibration is a general color calibration process, therefore detailed explanation thereof is omitted. Moreover, name information of the one-dimensional LUTs for calibration is stored in the hard disk 24 in association with the image data.

Next, the screening process is performed (step S109). In the present embodiment, the image data of which the color information has been calibrated in the process of step S108 is subject to the screening process designated by the print data received in the process of step S101. Since the screening process itself is well-known art, detailed explanation thereof is omitted. Moreover, unlike the present embodiment, the screening process may be performed by the printer 3a.

Then, the image data is output (step S110), and the processes are terminated. In the present embodiment, the image data to which the screening process has been performed in the process of step S109 is transmitted to the printer 3a, and the processes are terminated. The printer 3a which has received the image data prints the image based on the image data on a paper.

As described above, according to the processes of the flowchart illustrated in FIG. 9, the RIP process to the print data and the color conversion process by applying the LUT for color matching and the four-dimensional LUT for calibration are first performed simultaneously, and the image data of which the color information is calibrated is generated. Then, the color information of the image data is further calibrated by applying the one-dimensional LUTs for calibration, and the image data of which the color information is calibrated is output to the printer 3a. A sample for proofreading is generated by printing the image based on the image data by the printer 3a. The sample for proofreading is checked by the user, and if it is satisfactory, second round of printing process for printing required number of copies will be performed.

In order to keep the color consistent between the sample for proofreading printed in the first round of printing process and the image to be printed in the second round of printing process, new one-dimensional LUTs for calibration are generated just before the second round of printing process is performed. In the second round of printing process, the image data for which the color conversion process with the four-dimensional LUTs for calibration has been performed, which is stored in the hard disk 24 when generating the sample for proofreading, is read, and the latest one-dimensional LUTs for calibration are applied to the read image data.

Figure 10:
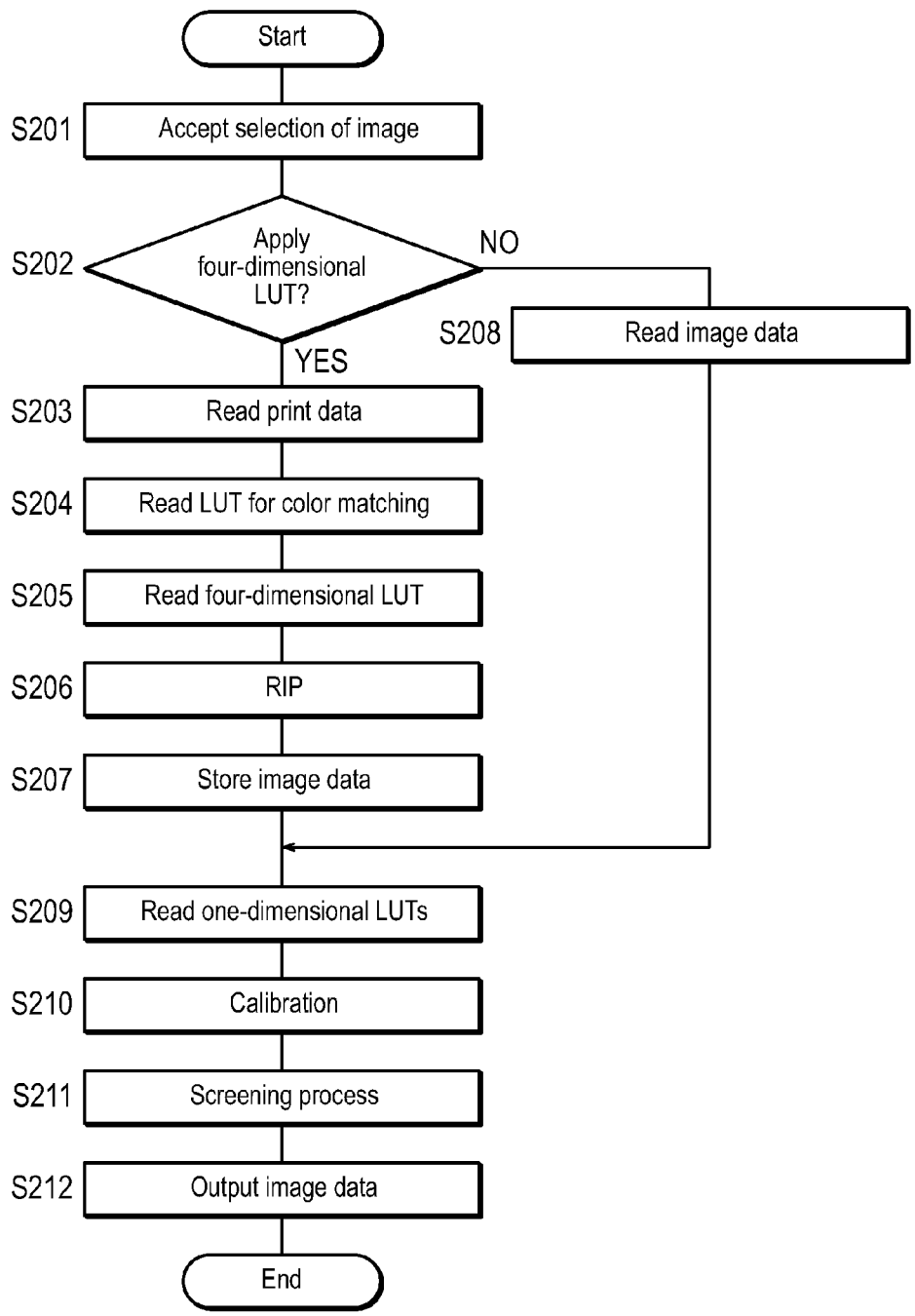
FIG. 10 is a flowchart which illustrates a procedure of a second printing process executed by the printer controller.
Figure 11:
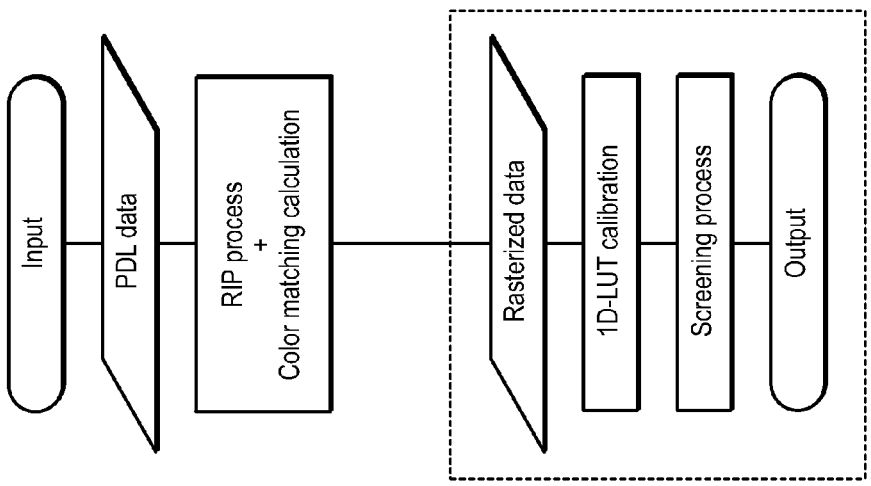
FIGS. 11A, 11B and 11C are drawings for explaining the function effect of the printing system.
Figure 11:
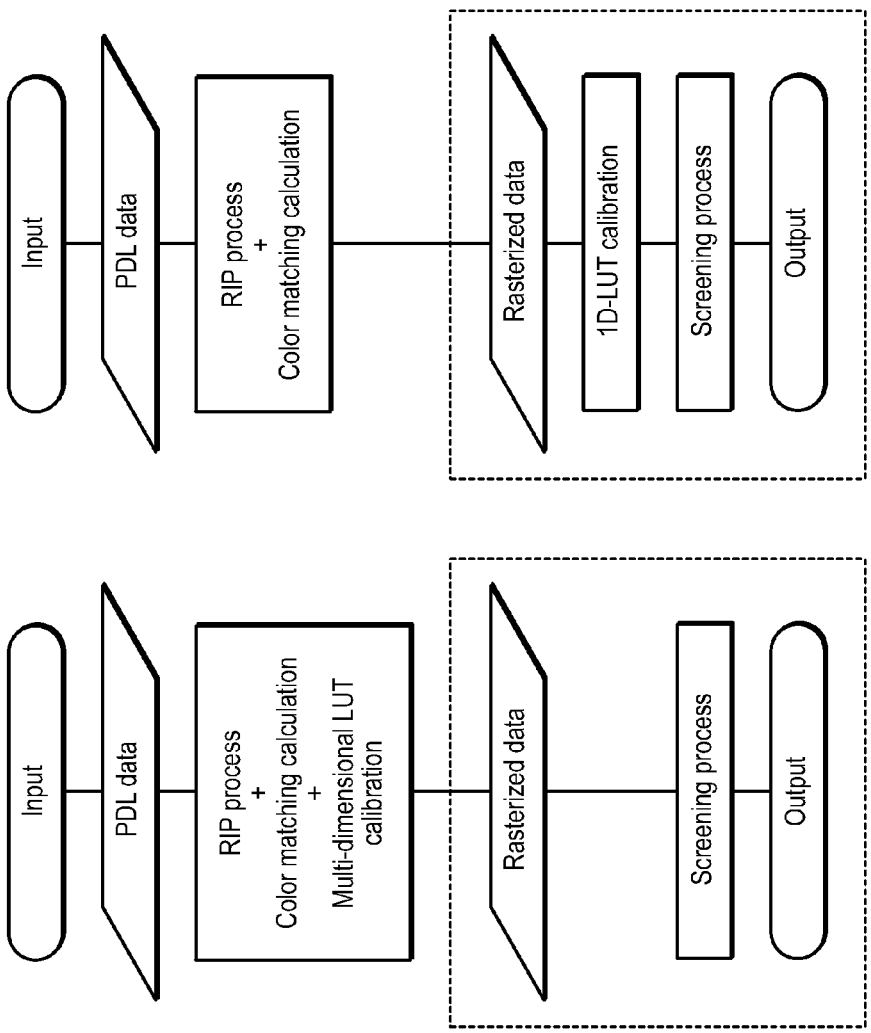
Figure 11:
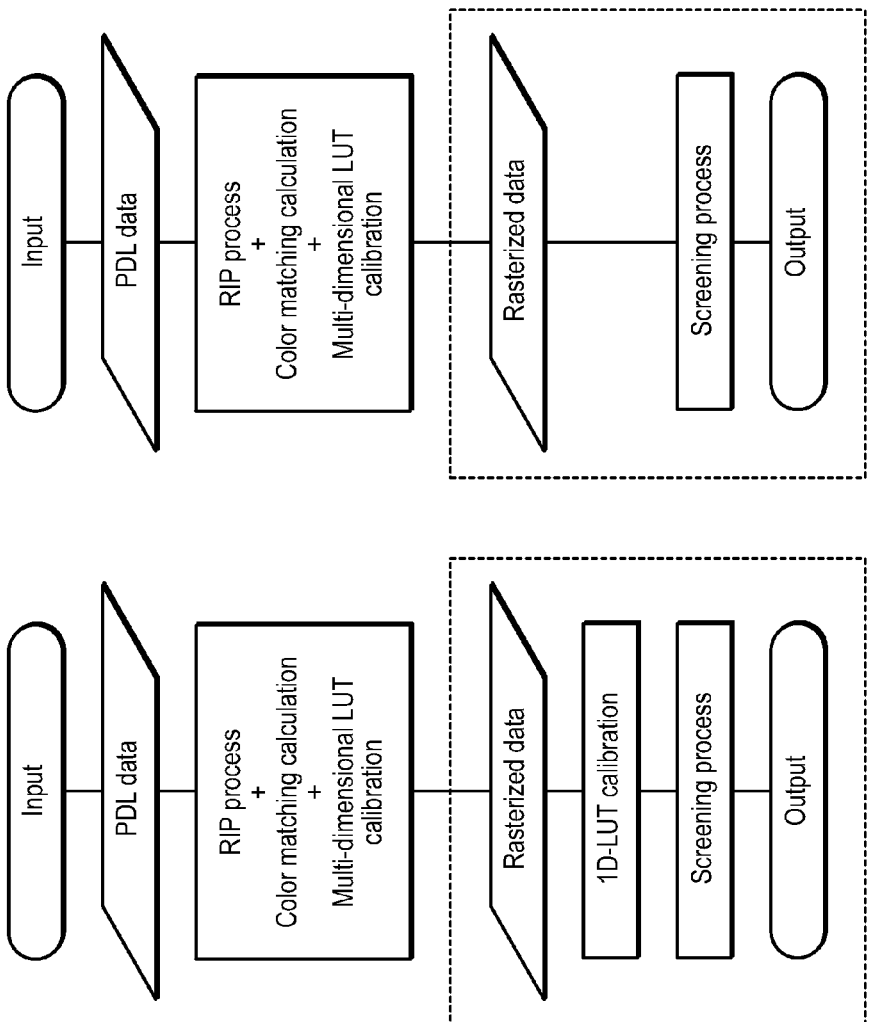

FIG. 10 is a flowchart which illustrates a procedure of the second printing process executed by the printer controller. The algorithm illustrated in the flowchart of FIG. 10 is stored as a program in the hard disk 24 of the printer controller 2a and is performed by the CPU 21.

First, a selection of an image is accepted (step S201). In the present embodiment, the selection of the image to be a subject of the second printing by the user is accepted. Specifically, a list of images corresponding to image data stored in the hard disk 24 is first displayed on the display 25. Then, the image selected by the user is accepted from among the list of the images displayed on the display 25.

Next, it is determined whether or not the four-dimensional LUT for calibration is to be applied (step S202). In the present embodiment, it is determined whether or not the color calibration with the four-dimensional LUT for calibration is to be performed. Specifically, a selection screen (not illustrated) for inducing the user to select whether or not the color conversion process in which the four-dimensional LUT for calibration is applied is to be performed again is displayed on the display 25. In accordance with a user's selection through the selection screen, it is determined whether or not the four-dimensional LUT for calibration is to be applied.

In cases where it is determined that the four-dimensional LUT for calibration is to be applied (step S202: YES), the print data is read (step S203). In the present embodiment, the print data corresponding to the image selected in the process of step S201 is read from among the print data which is stored in the hard disk 24 in association with the image data.

Next, the LUT for color matching is read (step S204). In the present embodiment, the LUT for color matching designated by the print data read in the process of step S203 is read from among a plurality of LUTs for color matching stored in the hard disk 24.

Next, the four-dimensional LUT for calibration is read (step S205). In the present embodiment, the four-dimensional LUT for calibration specified by the paper type and the screen type which are designated by the print data read in the process of step S203 is read from among a plurality of four-dimensional LUTs for calibration stored in the hard disk 24. In cases where two or more four-dimensional LUTs for calibration which have identical name are stored in the hard disk 24, the latest four-dimensional LUT for calibration is read.

Next, the RIP process is performed (step S206). In the present embodiment, the print data read in the process of step S203 is subject to the RIP process. Here, the LUT for color matching and the four-dimensional LUT for calibration which have been read in the processes of steps S204 and S205 are applied to perform the color conversion process.

Next, the image data is stored into the hard disk 24 (step S207). In the present embodiment, the image data generated in the process of step S206 is stored for reuse into the hard disk 24.

On the other hand, in cases where it is determined that the four-dimensional LUTs for calibration is not to be applied in the process of step S202 (step S202: NO), the image data is read (step S208). In the present embodiment, the image data corresponding to the image selected in the process of step S201 is read from among the image data stored in the hard disk 24. Here, the image data is the image data for which the color conversion process with the four-dimensional LUT for calibration is performed, which is stored in the hard disk 24 in the process of step S105 of FIG. 9.

Next, the one-dimensional LUTs for calibration are read (step S209). In the present embodiment, in order to calibrate the color information of the image data generated in the process of step S206 or the image data read in the process of step S208, appropriate one-dimensional LUTs for calibration are read. Specifically, with respect to the image data generated in the process of step S206, the one-dimensional LUTs for calibration specified by the paper type and the screen type which are designated by the print data are read from among a plurality of one-dimensional LUTs for calibration stored in the hard disk 24. On the other hand, with respect to the image data read in the process of step S208, the one-dimensional LUTs for calibration specified by the name information stored in association with the image data in the process of step S108 of FIG. 9 are read. In cases where two or more one-dimensional LUTs for calibration which have identical name are stored in the hard disk 24, the latest one-dimensional LUTs for calibration are read. As described above, the latest one-dimensional LUTs for calibration are generated just before the second round of printing process.

Next, the color calibration is performed (step S210). In the present embodiment, the one-dimensional LUTs for calibration read in the process of step S209 are applied, and the color information of each pixel of the image data generated in the process of step S206 or the image data read in the process of step S208 is calibrated.

Next, the screening process is performed (step S211). In the present embodiment, the image data of which the color information has been calibrated in the process of step S210 is subject to the screening process.

Then, the image data is output (step S212), and the processes are terminated. In the present embodiment, the image data to which the screening process is performed in the process of step S211 is transmitted to the printer 3a, and the processes are terminated. The printer 3a which receives the image data prints the image based on the image data on a paper.

As described above, according to the processes of the flowchart illustrated in FIG. 10, the user first selects whether or not the color conversion process is to be performed by applying the four-dimensional LUT for calibration. In cases where the user selects not to perform the color conversion process by applying the four-dimensional LUT for calibration, the image data for which the color conversion process with the four-dimensional LUT for calibration has been performed is read from the hard disk 24. Then, the color information of the image data is calibrated by applying the latest one-dimensional LUTs for calibration, and second printing of the image is performed based on the image data. According to such constitution, the color calibration can be performed without performing the RIP process again to the print data.

FIGS. 11A, 11B and 11C are drawings for explaining the function effect of the printing system. FIG. 11A is a drawing illustrating a procedure of the processes of the printing system in the present embodiment. FIG. 11B and FIG. 11C are drawings illustrating procedures of the processes of the printing system which performs the color calibration only using the four-dimensional LUT for calibration and the printing system which performs the color calibration only using one-dimensional LUTs for calibration, as comparative examples.

As illustrated in FIG. 11A, the printing system according to the present embodiment performs the color conversion process by applying the four-dimensional LUT for calibration when performing the RIP process to the print data (PDL data). Next, the color calibration is further performed to the image data (Rasterized data) obtained by performing the RIP process to the print data, by applying the latest one-dimensional LUTs for calibration. Then, the screening process is performed to the image data to which color calibration has been applied, and the image data to which the screening process has been performed is output. According to such constitution, in a case of performing the second printing, it becomes possible to perform the color calibration without performing the RIP process, by applying the latest one-dimensional LUTs for calibration to the image data for which the color conversion process with the four-dimensional LUT for calibration has been performed.

Note that in cases where an environmental condition is sharply changed and in cases where a materials lot is changed, it is necessary to perform the color calibration using the four-dimensional LUT for calibration. However, regarding a change for several days in the normal state, the processes only using the one-dimensional LUTs for calibration are sufficient.

On the other hand, as illustrated in FIG. 11B, in the printing system which performs the color calibration only using the four-dimensional LUT for calibration, the color conversion process is performed by applying the four-dimensional LUT for calibration when performing the RIP process to the print data, as the printing system of the present embodiment. However, in the printing system which performs the color calibration by applying only four-dimensional LUT for calibration, if it tries to perform the color calibration in second printing, it is necessary to perform the RIP process again. Performing the RIP process lead to long processing time.

Moreover, as illustrated in FIG. 11C, in the printing system which performs the color calibration only using the one-dimensional LUTs for calibration, the color calibration by applying the one-dimensional LUTs for calibration is performed to the image data obtained by performing the RIP process to the print data. However, the printing system which performs the color calibration by applying only one-dimensional LUTs for calibration cannot meet a change of the superposition balance of a plurality of base colors, and does not provide sufficient printing quality.

As described above, according to the present embodiment, the color calibration is performed by applying the four-dimensional LUT for calibration simultaneously with the RIP process to the print data in the first round of printing process, and after that, the color calibration is further performed by applying the one-dimensional LUTs for calibration. In the second round of printing process, the color calibration is performed to the image data, for which the color conversion process with the four-dimensional LUT for calibration has been performed, by applying only one-dimensional LUTs for calibration. As a result, in the second round of printing process, it is possible to perform the color calibration without performing the RIP process.

A process in the printer controller 2a of the present embodiment has been described which calibrates the color information of image data by applying the one-dimensional LUTs for calibration and the four-dimensional LUT for calibration. Hereinafter, with reference to FIG. 12 and FIG. 13, the process which creates the one-dimensional LUTs for calibration and the four-dimensional LUTs for calibration will be explained.

Figure 12:
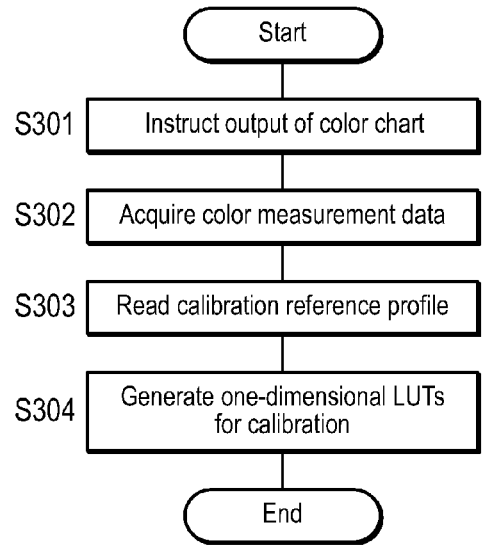
FIG. 12 is a flowchart which illustrates a procedure of one-dimensional LUT for a calibration generating process executed by the profiler.

FIG. 12 is a flowchart which illustrates a procedure of one-dimensional LUTs for calibration generating process executed by the profiler. The algorithm illustrated by the flowchart of FIG. 12 is stored as a program in the hard disk 44 of the profiler 4 and is performed by the CPU 41.

First, an output of a color chart is instructed (step S301). In the present embodiment, the output of the color chart for calibration is instructed to the printer controller 2a. Instructing the output of the color chart to the printer controller 2a causes the printer 3a to print the color chart. As the color chart, one can be used in which monochrome steps of YMCK are arranged on a paper at each step of a suitable dot area ratio. Alternatively, in cases where the four-dimensional LUT for calibration is generated with one-dimensional LUTs for calibration, the ones which comply with standards such as IT8.7/3 (ISO12642 pattern), IT8.7/4, and ECI2002, and ones in which color patches combining the monochrome steps of YMCK and 0%, 10%, 20%, 40%, 70%, 100% etc. of YMCK are arranged can be used as the color chart.

Next, the color measurement data is acquired (step S302). In the present embodiment, the color patches included in the color chart printed by the printer 3a in the process of step S301 are measured by the color measurement device 5, and the color measurement data is acquired. The measurement data is expressed by the color system independent of input/output devices, such as L*a*b* and XYZ.

Next, the calibration reference profile is acquired (step S303). In the present embodiment, the calibration reference profile is acquired for use as a reference at the time of generating the one-dimensional LUTs for calibration. The calibration reference profile includes CMYK→L*a*b* LUT and L*a*b*→CMYK LUT of the printer 3a in a base condition. The base condition of the printer 3a may be defined at the time of shipping the printer 3a, or may be set by the user. These can be generated in a similar way to a general ICC device profile (for example, refer to Unexamined Japanese Patent Publication No. 2004-356952).

Then, the one-dimensional LUTs for calibration are generated (step S304), and processes are terminated. In the present embodiment, for example, the one-dimensional LUTs for calibration are generated based on the calibration reference profile acquired in the process of step S303, so that the step of the density for each color after calibration is the same as the step of the density of the calibration reference profile. A method for generating the one-dimensional LUTs for calibration using the calibration reference profiles is a general generating method of one-dimensional LUTs for calibration, therefore detailed explanation thereof is omitted. Moreover, unlike the present embodiment, the one-dimensional LUTs for calibration may be generated so that all of or a component of other color value(s) (for example, L*a*b*) are equal.

As described above, according to the process of the flowchart illustrated in FIG. 12, the one-dimensional LUTs for calibration can be generated. Time information is added to the generated one-dimensional LUTs for calibration, and the one-dimensional LUTs for calibration with the time information is stored into the hard disk 24 of the printer controller 2a.

Figure 13:
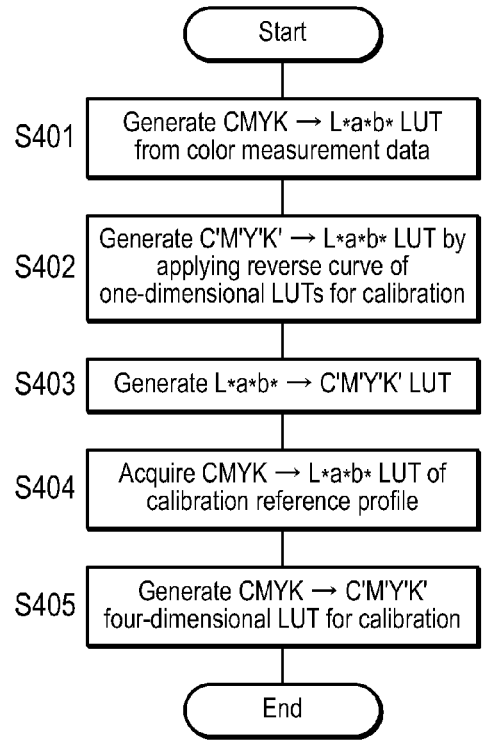
FIG. 13 is a flowchart which illustrates a procedure of a multi-dimensional LUT for calibration generating process executed by the profiler.

FIG. 13 is a flowchart which illustrates a procedure of a multi-dimensional LUT for calibration generating process executed by the profiler. The algorithm illustrated by the flowchart of FIG. 13 is stored as a program in the hard disk 44 of the profiler 4 and is performed by the CPU 41.

First, a CMYK→L*a*b* LUT is generated (step S401). In the present embodiment, the CMYK→L*a*b* LUT which provide a relation between CMYK values and L*a*b* values at the time of calibration is generated using the color measurement data of the color chart acquired in the process of step S302 of FIG. 12 and using interpolation calculation.

Next, a C'M'Y'K'→L*a*b* LUT is generated (step S402). In the present embodiment, a reverse curve of the one-dimensional LUTs for calibration generated in the process of step S304 of FIG. 12 is calculated, and the reverse curve is applied to the CMYK→L*a*b* LUT generated in the process of step S401, thus the C'M'Y'K'→L*a*b* LUT is generated.

Next, a L*a*b*→C'M'Y'K' LUT is generated (step S403). In the present embodiment, the L*a*b*→C'M'Y'K' LUT is generated from the C'M'Y'K'→L*a*b* LUT generated in the process of step S402.

Next, a CMYK→L*a*b* LUT of the calibration reference profile is acquired (step S404). In the present embodiment, the CMYK→L*a*b* LUT of the calibration reference profile stored in the hard disk 44 is acquired.

Then, a CMYK→C'M'Y'K' four-dimensional LUT for calibration is generated (step S405), and processes are terminated. In the present embodiment, by calculating the C'M'Y'K' values at the time of the calibration which provides the same L*a*b* values as respective CMYK values of the calibration reference profile based on the CMYK→L*a*b* LUT of the calibration reference profile acquired in the process of step S404 and the L*a*b*→C'M'Y'K' LUT generated in the process of step S403, the four-dimensional LUT for calibration which has the relation of CMYK→C'M'Y'K' is generated.

As described above, according to the process of the flowchart illustrated in FIG. 13, the four-dimensional LUT for calibration is generated. In the printing system of the present embodiment, since the one-dimensional LUTs for calibration are applied after the color conversion process in which the four-dimensional LUTs for calibration is applied as described above, the reverse curve of the one-dimensional LUTs for calibration is applied to the four-dimensional LUTs for calibration in advance. Time information is added to the generated four-dimensional LUT for calibration, and the four-dimensional LUT for calibration with the time information is stored into the hard disk 24 of the printer controller 2a.

Note that in calculation of LUTs for calibration, interpolation calculation such as triangular pyramid interpolation and pyramid interpolation, or Gamut Mapping is used if necessary. Moreover, in case of generating the four-dimensional LUTs for calibration, in order to calculate the CMYK values uniquely from the L*a*b* values, UCR (Under Color Removal)/GCR (Gray Color Replacement) can be used. Since above-mentioned interpolation calculation, Gamut Mapping and UCR/GCR is well-known art, detailed explanation thereof is omitted (refer to Unexamined Japanese Patent Publication No. 2004-356952). The multi-dimensional LUTs for calibration may include a one-dimensional LUT on the input or output side. For example, in cases where a general, ICC Profile is used as the calibration reference profile, using an input side curve of A to B table of the profile as an input side curve of the multi-dimensional LUT for calibration allows calibration accuracy to increase, which is desirable.

According to the printing system of the present embodiment, LUT for calibration is divided into the multi-dimensional LUT for calibration and the one-dimensional LUTs for calibration. Furthermore, in case of second round of printing, the color information of the image data for which the color conversion process with the four-dimensional LUTs for calibration has been performed is calibrated by applying the latest one-dimensional LUTs for calibration, therefore the color calibration can be performed without performing the RIP process again to the print data. As a result, processing time can be reduced.

The present invention is by no means limited to the embodiment described above and can be modified in various ways within the scope of claims.

For example, in the above-described embodiment, the four-dimensional LUT for calibration and the one-dimensional LUTs for calibration are selected based on the paper type and the screen type which are designated in the print data. However, the paper type and the screen type may be set on the printer controller side separately from the print data. Furthermore, the four-dimensional LUT for calibration and one-dimensional LUTs for calibration may be selected based on either the paper type or the screen type, and the four-dimensional LUT for calibration and one-dimensional LUTs for calibration may be selected regardless of the paper type and the screen type.

In the above-described embodiment, in case of second round of printing process in the printing system, the latest one-dimensional LUTs for calibration is applied. However, it may be not necessary that the one-dimensional LUTs for calibration are the newest. For example, reference is made to the time information added to the one-dimensional LUTs for calibration, and a one-dimensional LUT for calibration, which is newer than the one-dimensional LUT for calibration used in the first round of printing process, may be selected by the user.

In the above-described embodiment, at the second round of printing process, it is selected whether or not the four-dimensional LUT for calibration is to be applied by the user. However, the manner of applying the four-dimensional LUT for calibration and one-dimensional LUTs for calibration can be selected in various ways. For example, in the second round of printing process, the one-dimensional LUTs for calibration generated at the same date and time as the LUT used in the first printing process may be applied. Alternatively, in cases where there is a newer four-dimensional LUT for calibration in the printing system, this four-dimensional LUT for calibration is certainly applied, and the RIP process may be performed again.

Moreover, in the above-described embodiment, the profiler is provided separately from the printer controller. However, the profiler may be implemented as a function of the printer controller. In this case, the color measurement device is also connected to the printer controller. Alternatively, the color measurement device may be provided in the printer.

The units and the method for performing the various processes in the printing system according to the present embodiment can be implemented by a dedicated hardware circuit or a programmed computer. The above-mentioned program may be provided, for example, by a computer readable recording medium such as a flexible disk and CD-ROM and may be provided on-line through a network such as Internet. In this case, the program recorded on the computer readable recording medium is usually transferred to a storage unit such as a hard disk and is stored. Moreover, the above-mentioned program may be provided as independent application software, or may be embedded in software of the apparatus as a function of the printing system.

What is claimed is:

1. A printing system comprising:
  a receiving unit that receives print data for an image to be printed by a printing unit;
  a generating unit that performs a rasterizing process to the print data received by said receiving unit, and performs a color conversion process by applying a multi-dimensional lookup table for calibration, which multi-dimensional lookup table for calibration is for matching a color of the image to be printed by the printing unit by combining a plurality of base colors to a target color and for keeping the color of the image consistent, to generate image data for the image to be printed by the printing unit, the image data having color information, of which image data the color information has been calibrated;
  an image data storage unit that stores the image data generated by said generating unit;
  a calibration unit that applies a first one-dimensional lookup table for calibration, which first one-dimensional lookup table for calibration is for keeping the color of the image to be printed by said printing unit consistent for each base color, to calibrate the color information of the image data generated by said generating unit at a first round of printing the image based on the image data, and applies a second one-dimensional lookup table for calibration, the second one-dimensional lookup table for calibration being generated after said first one-dimensional lookup table for calibration, to calibrate the color information of the image data stored in said image data storage unit at a second round of printing the image based on the image data; and an output unit that outputs the image data of which the color information has been calibrated by said calibration unit.

2. The printing system as claimed in claim 1, further comprising:

a screening process unit that performs a screening process to the image data; and a table storage unit that stores a plurality of multi-dimensional lookup tables for calibration and one-dimensional lookup tables for calibration in association with at least one of a paper type on which the image is printed by said printing unit and a screen type in said screening process, wherein the multi-dimensional lookup table for calibration, and the first and second one-dimensional lookup tables for calibration, which are applied by said generating unit and said calibration unit respectively, are selected in accordance with at least one of the paper type and the screen type from among a plurality of multi-dimensional lookup tables for calibration and one-dimensional lookup tables for calibration stored in said table storage unit.

3. The printing system as claimed in claim 1, further comprising:

an accepting unit that accepts, at the second round of printing the image based on the image data, a selection from a user as to whether or not the color conversion process by applying another multi-dimensional lookup table for calibration is to be performed, wherein, in cases where not performing the color conversion process by applying the another multi-dimensional lookup table for calibration is selected by the user, said calibration unit applies said second one-dimensional lookup table for calibration to calibrate the color information of the image data stored in said image data storage unit.

4. A printing method comprising:

(a) receiving print data for an image to be printed by a printing unit;

(b) performing a rasterizing process to the print data received in step (a), and performing a color conversion process by applying a multi-dimensional lookup table for calibration, which multi-dimensional lookup table for calibration is for matching a color of the image to be printed by the printing unit by combining a plurality of base colors to a target color and for keeping the color of the image consistent, to generate image data for the image to be printed by the printing unit, the image data having color information, of which image data the color information has been calibrated;

(c) storing the image data generated in step (b) into an image data storage unit;

(d) applying a first one-dimensional lookup table for calibration, which first one-dimensional lookup table for calibration is for keeping the color of the image to be printed by said printing unit consistent for each base color, to calibrate the color information of the image data generated in step (b);

(e) outputting the image data of which the color information has been calibrated in step (d);

(f) applying a second one-dimensional lookup table for calibration, the second one-dimensional lookup table for calibration being generated after said first one-dimensional lookup table for calibration, to calibrate the color information of the image data stored in said image data storage unit; and (g) outputting the image data of which the color information has been calibrated in step (f).

5. The printing method as claimed in claim 4, wherein a plurality of multi-dimensional lookup tables for calibration and one-dimensional lookup tables for calibration are stored in a table storage unit in association with at least one of a paper type on which the image is printed by said printing unit and a screen type in a screening process to be performed to the image data, and the multi-dimensional lookup table for calibration, and the first and second one-dimensional lookup tables for calibration, which are applied in step (b), step (d) and step (f) respectively, are selected in accordance with at least one of a paper type and a screen type from among a plurality of multi-dimensional lookup tables for calibration and one-dimensional lookup tables for calibration stored in said image data storage unit.

6. The printing method as claimed in claim 4, further comprising, between step (e) and step (f)

(h) accepting a selection from a user whether or not the color conversion process by applying another multi-dimensional lookup table for calibration is to be performed, wherein, in cases where not performing the color conversion process by applying the another multi-dimensional lookup table for calibration is selected by the user, said second one-dimensional lookup table for calibration is applied in step (f) to calibrate the color information of the image data stored in said image data storage unit.

7. A non-transitory computer readable recording medium stored with printing program, said program causing a computer to execute a process comprising:

(a) receiving print data for an image to be printed by a printing unit;

(b) performing a rasterizing process to the print data received in step (a), and performing a color conversion process by applying a multi-dimensional lookup table for calibration, which multi-dimensional lookup table for calibration is for matching a color of the image to be printed by the printing unit by combining a plurality of base colors to a target color and for keeping the color of the image consistent, to generate image data for the image to be printed by the printing unit, the image data having color information, of which image data the color information has been calibrated;

(c) storing the image data generated in step (b) into an image data storage unit;

(d) applying a first one-dimensional lookup table for calibration, which first one-dimensional lookup table for calibration is for keeping the color of the image to be printed by said printing unit consistent for each base color, to calibrate the color information of the image data generated in step (b);

(e) outputting the image data of which the color information has been calibrated in step (d);

(f) applying a second one-dimensional lookup table for calibration, the second one-dimensional lookup table for calibration being generated after said first one-dimensional lookup table for calibration, to calibrate the color information of the image data stored in said image data storage unit; and (g) outputting the image data of which the color information has been calibrated in step (f).

8. The non-transitory computer readable recording medium as claimed in claim 7, wherein
a plurality of multi-dimensional lookup tables for calibration and one-dimensional lookup tables for calibration are stored in a table storage unit in association with at least one of a paper type on which the image is printed by said printing unit and a screen type in a screening process to be performed to the image data, and
the multi-dimensional lookup table for calibration, and the first and second one-dimensional lookup tables for calibration, which are applied in step (b), step (d) and step (f) respectively, are selected in accordance with at least one of a paper type and a screen type from among a plurality of multi-dimensional lookup tables for calibration and one-dimensional lookup tables for calibration stored in said image data storage unit.

9. The non-transitory computer readable recording medium as claimed in claim 7, wherein said process further comprises, between step (e) and step (f)

(h) accepting a selection from a user whether or not the color conversion process by applying another multi-dimensional lookup table for calibration is to be performed, wherein, in cases where not performing the color conversion process by applying the another multi-dimensional lookup table for calibration is selected by the user, said second one-dimensional lookup table for calibration is applied in step (f) to calibrate the color information of the image data stored in said image data storage unit.

* * * * *